(12) United States Patent
Farina

(10) Patent No.: US 9,812,737 B2
(45) Date of Patent: Nov. 7, 2017

(54) PLANT AND PROCESS FOR THE ELECTROCHEMICAL FORMATION OF LEAD-ACID BATTERIES

(71) Applicant: SOVEMA S.p.A., Villafranca (VR) (IT)

(72) Inventor: Pietro Farina, Villafranca (IT)

(73) Assignee: SOVEMA S.P.A, Villafranca (IT)

( * ) Notice: Subject to any disclaimer, the term of this patent is extended or adjusted under 35 U.S.C. 154(b) by 838 days.

(21) Appl. No.: 14/071,676

(22) Filed: Nov. 5, 2013

(65) Prior Publication Data
US 2014/0123475 A1   May 8, 2014

(30) Foreign Application Priority Data

Nov. 6, 2012   (IT) .............................. PD2012A0329

(51) Int. Cl.
| | |
|---|---|
| *H01M 10/12* | (2006.01) |
| *H01M 2/36* | (2006.01) |
| *B65B 31/00* | (2006.01) |
| *B67C 3/00* | (2006.01) |

(52) U.S. Cl.
CPC ......... *H01M 10/121* (2013.01); *H01M 2/362* (2013.01); *H01M 10/12* (2013.01); *B65B 31/00* (2013.01); *B67C 3/00* (2013.01); *Y02T 10/7016* (2013.01); *Y10T 29/49108* (2015.01); *Y10T 29/53135* (2015.01)

(58) Field of Classification Search
CPC ......... H01M 2/36; H01M 10/12; B65B 31/00; B67C 3/00
USPC ......... 29/730, 623.1–623.5; 141/59; 137/260
See application file for complete search history.

(56) References Cited

U.S. PATENT DOCUMENTS

| | | | |
|---|---|---|---|
| 6,644,338 B1 * | 11/2003 | Campau ............... | H01M 2/362 137/260 |
| 2009/0314383 A1 | 12/2009 | Anniello | |
| 2010/0205801 A1 * | 8/2010 | Farina ................... | H01M 2/362 29/730 |

FOREIGN PATENT DOCUMENTS

| | | |
|---|---|---|
| EP | 2 204 866 | 7/2010 |
| WO | 2004/102691 | 11/2004 |

* cited by examiner

*Primary Examiner* — Jonathan G Leong
(74) *Attorney, Agent, or Firm* — Mark M. Friedman

(57) ABSTRACT

Plant for the electrochemical formation of lead-acid batteries, which comprises an external circuit (5) in which an electrolytic solution flows with controlled temperature; such solution traverses the single cells (2) provided with metering caps (17) provided with an inlet duct (18) connected with a first connector to a distribution manifold (9) of the circuit and with an outlet duct connected with a second connector to return means (7) of the circuit. The plant also comprises suction means connected to the distribution manifold (9) and actuatable to suck, with the feeding to the distribution manifold (9) interrupted, the electrolytic solution contained in the distribution manifold (9) as well as possible lumps therewith that have stopped in the inlet ducts and/or in the first connectors for feeding the cells (2).

10 Claims, 5 Drawing Sheets

PLANT AND PROCESS FOR THE ELECTROCHEMICAL FORMATION OF LEAD-ACID BATTERIES

FIELD OF APPLICATION

The present invention regards a plant and a process for the electrochemical formation of lead-acid batteries, according to the preamble of the relative independent claims.

The present plant is intended to be employed in the industrial field of the production of lead-acid batteries and, in particular, for their electrochemical formation, such as batteries for vehicles, stationary batteries for supplying equipment with electrical energy or industrial batteries for the traction of electric vehicles.

STATE OF THE ART

The industrial processes for the production of lead batteries conventionally provide for a step of assembly of the single voltaic elements that comprise the batteries, with the arrangement, in plastic material containers, of plates formed by lead grids supporting the active material (lead, lead sulfate etc.) which participates in the electrochemical reactions. The positive and negative plates are electrically connected to each other in order to obtain the electrodes; they are immersed in a concentrated acidic aqueous solution, indicated hereinbelow as electrolytic solution, generally with sulfuric acid (electrolyte), and are electrically divided by separators adapted to isolate the electrodes from each other, allowing the electrolyte to freely circulate.

The plates are thus those elements where, during the discharging and charging of the batteries, the electrochemical reactions occur for the transformation of chemical energy into electrical energy and vice versa. During discharging, at the anode, there is an oxidation reaction, and at the cathode a reduction reaction which allows generating an electromotive force at the electrodes.

At the time of their production, the plates are inert or inactive and are transformed to active state by means of a process of electrochemical formation adapted to transform the oxide and the lead sulfate into spongy metallic lead and lead dioxide, which constitute the active material of the plates, respectively the negative and positive plates.

This step of electrochemical formation of the plates requires supplying the electrodes of the elements that form the batteries with direct current, causing the charging of such batteries up to the provided voltage and current intensity values and thus preparing them for sale and use.

During the step of formation of the plates, there is an increase of the temperature of the electrodes and of the electrolytic solution, due to the endothermic chemical reactions that take place during charging as well as due to the ohmic effect arising from the passage of the direct current.

Formation processes and plains are known that are aimed to control the temperature during the process of electrochemical formation of the plates, in order to avoid ruining the active material set thereon and to accelerate the formation of the batteries by allowing the use, in at least some intervals, of high currents. For such purpose, the temperature must preferably be maintained below 60° C.

In accordance with a known plant for the electrochemical formation of lead-acid batteries, the electrolytic solution contained in the cells of the batteries is made to circulate in an external circuit, in which its temperature characteristics are controlled with a heat exchanger, and preferably also its electrolyte concentration is controlled. More clearly, the circulation of the electrolyte fluid in the cells and in a circuit external thereto allows controlling the temperature of the electrolyte and hence the temperature at the interior of the cells, and thus allows shortening the charging times by allowing the application of high currents to the electrodes.

The external circuit, in which the electrolytic solution flows, comprises a distribution manifold fed by means of supply means with a flow of electrolytic solution at a constant piezometric pressure, and a collection manifold for converging the flow of electrolytic solution drawn from the cells.

For such purpose, as is known, each cell (or voltaic element or only "element" for the sake of brevity), is provided with a metering cap removably and sealingly inserted in a provided opening obtained on the upper part on the cover of the plastic container of the battery.

Each metering cap is provided with an inlet duct, through which the electrolytic solution is introduced into the cell, and an outlet duct, through which the electrolytic solution is extracted from the cell. The inlet and outlet ducts of the metering cap of each element are connected by means of first and second connector tubes respectively to the electrolytic solution distribution manifold which receives the solution from a delivery duct, and to the electrolytic solution collection manifold which conveys such solution to a return duct. Therefore, during the process of charging the batteries, time intervals are provided in which the electrical power supply is carried out with high currents, and thus the electrolytic solution is made to flow into the cells, heating up and then cooling in the external circuit.

The electrolytic solution is forcibly introduced inside each cell, obliging that already present to exit under pressure; otherwise, the extraction of the electrolytic solution occurs through a suction duct under low pressure, as is better illustrated hereinbelow.

The inlet duct has a section of calibrated size adapted to feed the cell with a pre-established flow rate determined by the piezometric height at which the distribution manifold is situated.

In order to increase the contact surface area of the negative plate, additives made of organic material are known to be inserted in the active material. Such additives include, for example, carbon black and wood dust, which during the charging step are attacked by the sulfuric acid of the electrolytic solution, passing into solution and thus leaving cavities in the negative plate that come to considerably increase the contact surface area of the plate for the subsequent charging and discharging reactions.

A problem felt in the industrial field of the production of lead batteries lies in the fact that the aforesaid organic material additives that come into solution in the electrolyte during the process of formation of the batteries, i.e. which enter into the electrolytic solution in the form of small corpuscles, tend to join together, forming lumps with increasingly large size. Such lumps, once they have reached the calibrated inlet ducts arranged as a bypass from the distribution manifold and aimed to feed the cells, can have size such to obstruct the inlet ducts, preventing the circulation of the electrolytic solution, with the consequent overheating of the cell and hence the consequent damage thereof. Indeed, the cell, no longer receiving the electrolytic solution that removes the heat of the charge current, is overheated until it is burned, dried out or physically deformed.

In order to ensure that the inlet ducts of the circuit of the electrolyte are all free of lumps of organic material, several caps of known type are employed in the battery formation plants present today on the market. Such caps are made of transparent plastic material and contain a screw clearly visible from the outside that rotates with the passage of the electrolytic fluid flow, illustrating the correct functioning of the metering cap, i.e. the perfect operation thereof.

If the screw is stopped, the operator can detect the absence of flow and hence diagnose the blockage of the inlet duct due to a granule that has formed at the mouth of the calibrated section of the inlet duct.

The use of caps of known type, described above, involves greater production costs due to the presence of the screw display mechanism and above all does not allow an easy resolution of the problem of the clogging of the inlet ducts, given that the verification of the functioning of the screw depends on the visual control by an operator who therefore must continually verify the rotation of the screw of hundreds of cells of hundreds of batteries.

A further drawback lies in the fact that once the occlusion of an inlet duct of a cap associated with a cell has been discovered, the operator must detach the relative connector tube, usually constituted by a flexible rubber duct, and he must clear the inlet duct of the cap constituted by a rigid spout, in which the connector tube was coupled.

Such complex and long operations for clearing the occlusions require specialized personnel, and negatively affect the efficiency of the process of electrochemical formation of the batteries; in addition, they do not allow the possibility to ensure an equivalent formation quality to all the batteries.

PRESENTATION OF THE INVENTION

The problem underlying the present invention is to overcome the drawbacks revealed by the processes and plants of known type, by providing a plant and a process for the electrochemical formation of lead-acid batteries, which ensure the correct charging of all the connected batteries, preventing the risk of overheating of each of these.

Particular object of the present invention is to provide a plant and a process for the electrochemical formation of lead-acid batteries which allow preventing the occlusion of the inlet ducts of the metering caps employed for feeding the batteries with a flow of electrolytic solution circulating in an external circuit.

Another object of the present invention is to provide a plant and a process for the electrochemical formation of lead-acid batteries which are completely automatic and do not require personnel for clearing the inlet ducts of the metering caps.

Further object of the present invention is to provide a plant for the electrochemical formation of lead-acid batteries which is structurally inexpensive to achieve and entirely reliable in operation.

The process and the plant according to the present invention allow attaining the advantage of ensuring that all the cells of the batteries are always fed a flow of electrolytic solution with predefined flow rate.

BRIEF DESCRIPTION OF THE DRAWINGS

The technical characteristics of the finding, according to the aforesaid objects, can be clearly seen in the contents of the below-reported claims, and the advantages thereof will be more evident in the following detailed description, made with reference to the enclosed drawings which represent several merely exemplifying and non-limiting embodiments of the invention, in which:

FIG. 3' shows a variant of FIG. 3 in which the metering cap is provided with two ducts of which one is outlet and one inlet having a branch for forming the ventilation duct;

DETAILED DESCRIPTION OF A PREFERRED EMBODIMENT

Figure 1:
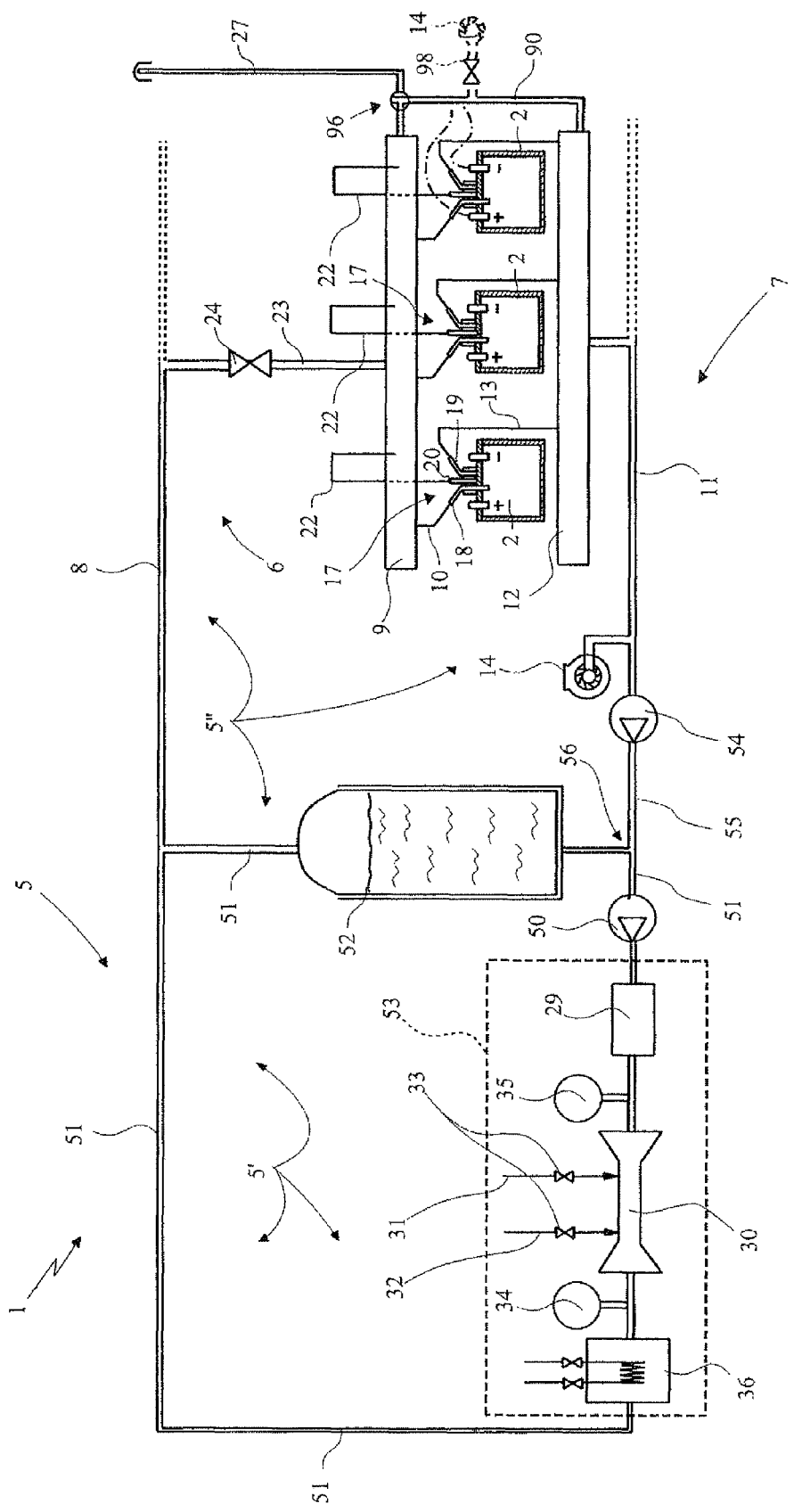
FIG. 1 shows a diagram of a first embodiment of a plant for the electrochemical formation of lead-acid batteries, object of the present invention, with electrolytic solution flow drawn from the cells by means of suction.

With reference to the figures of the set of drawings, reference number 1 indicates a plant for the electrochemical formation of lead-acid batteries, object of the present invention, in its entirety.

In accordance with the aforesaid figure, a plurality of elements or cells 2 of batteries is positioned above a bed or a pallet (not illustrated) for an easy transport. Each battery comprises, in an entirely conventional manner, a rigid container 2', made of plastic material and with box-like shape, which is closed on the upper part by a cover 2" that carries, externally and projectingly fixed, a positive electrode 3 and a negative electrode 4. Inside the rigid container, multiple cells 2 are housed, usually six of these; such cells are susceptible of generating overall an electromotive force of 12 Volts (2 Volts for each cell).

Each electrode 3, 4 is also extended inside the container 2' in order to obtain the electrical connection with the respective plates (not illustrated) of the same polarity. The electrodes 3, 4 are connected for the process of electrochemical forming with respective conduction bars of opposite polarity, in turn connected to an electrical energy source that supplies them with direct current according to pre-established charge programs.

The plant comprises an external circuit 5, of which FIG. 1 shows only one of the various possible embodiments, in which an electrolytic solution circulates; in accordance with the prior art such solution can be obtained, in an entirely conventional manner, mainly with sulfuric acid (electrolyte) diluted in an aqueous solution. The circuit 5 is configured, as will be better described hereinbelow, in order to reach all the cells 2 that are subjected to the process of electrochemical formation of the plant 1, by making a flow of electrolytic solution circulate through such cells, such flow being suitably cooled and with its electrolyte solution controlled.

The negative plates are provided with additives made of organic material, such as carbon black and wood dust, which during the charging step are attacked by the sulfuric acid of the electrolytic solution, passing into solution and thus leaving cavities in the active material that considerably increase the contact surface area of the negative plate for the subsequent charging and discharging reactions.

As explained in the preamble section of the present patent, such additives partially in solution in the electrolytic solution are susceptible of forming lumps which, as specified below, can interfere with the correct feeding of the cells 2 by the external circuit 5 for distributing the electrolytic solution.

In accordance with the embodiment of the plant 1 illustrated in the enclosed figures, the circuit 5 for circulating the electrolytic solution comprises supply means 6 for feeding the cells 2 of the batteries with a flow of electrolytic solution at a controlled piezometric pressure, and return means 7 for drawing the aforesaid flow of electrolytic solution from the cells 2 so as to generate a continuous circulation of solution at their interior.

Preferably, as will be specified hereinbelow, the aforesaid external circuit 5 that feeds the cells 2 is also capable of maintaining the concentration of electrolyte substantially constant.

More in detail, the supply means 6 comprise a delivery tube 8 connected to at least one distribution manifold 9 in order to convey the flow of electrolytic solution into the cells 2 of the batteries.

The distribution manifold 9 is horizontally extended in tubular form. Preferably, in a normal plant 1, numerous distribution manifolds 9 are provided that are arranged in succession with the extension axes thereof aligned along a direction parallel to that of the longitudinal extension of the plant 1 (and in particular to that of the delivery tube 8), for feeding numerous corresponding charge stations positioned along the same plant 1 and adapted to charge batteries (i.e. all the cells 2 of the batteries A) that can even have different electrical characteristics with respect to each other.

The distribution manifold 9 is fed by the delivery tube 8 by means of a first connection tube 23 intercepted by a first valve 24.

In turn, the return means 7 comprise a collection tube 11 connected advantageously to at least one collection manifold 12, which receives, from the cells 2, the flow of electrolytic solution that had been introduced to their interior by the distribution manifold 9.

The collection manifold 12 is horizontally extended in tubular form, parallel to the distribution manifold 9 in order to store, at its interior, the flow of electrolytic solution coming from each cell 2.

Advantageously, numerous collection manifolds 12 are provided, arranged in succession with their extension axes aligned along a direction parallel to that of the longitudinal axis of the plant 1 (and in particular to that of the collection tube 11), in order to receive the flow of electrolytic solution from the numerous charge stations positioned along the same plant 1.

On the cover of each element 2, an opening 16 is obtained in which a metering cap 17 is sealingly inserted, connected in a removable manner. For such purpose, it can be provided with a sealing gasket and with anchorage means, such as a snap coupling via elastic deformation of a provided annular appendage, or a thread adapted to be engaged in a corresponding counter-thread obtained on the edge of the opening 16, or still other equivalent solutions.

Each metering cap 17 is provided with at least one inlet duct 18 and with one outlet duct 19 which are connected to the external circuit for distributing the electrolytic solution before starting up the plant 1.

The inlet duct 18 of the metering cap 17 of each element 2 is connected by means of a first connector 10 to the distribution manifold 9, for feeding the corresponding cells 2 with the flow of electrolytic solution; the outlet duct 19 is connected with a second connector 13 to the collection manifold 12, for extracting the flow of electrolytic solution from the cells 2 themselves, i.e. that same flow that entered into the containers of the cells 2 through the inlet duct 18.

Each metering cap 17 is connected with a third ventilation connector 22 in order to connect the internal environment of the corresponding cell 2, defined beneath the cover 2", with the external environment at atmospheric pressure, for the purpose of diluting the formation of inflammable gases inside the cell itself 2.

Figure 3:
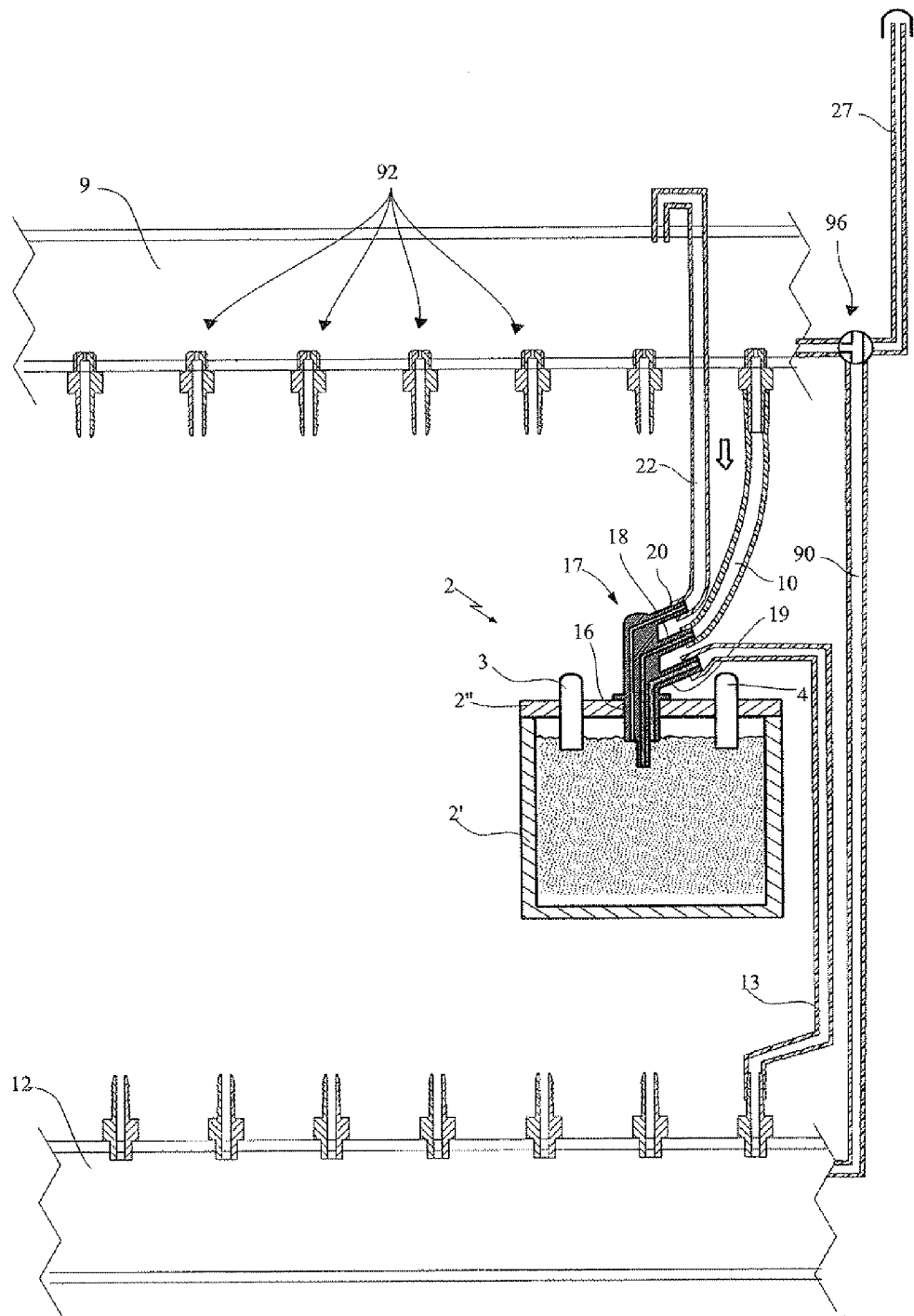
FIG. 3 shows a detail of the plant of FIG. 1 with a cell visible that is connected to a distribution manifold and to a collection manifold, also having a metering cap provided with three ducts of which one is inlet, one outlet and one ventilation.
Figure 3:
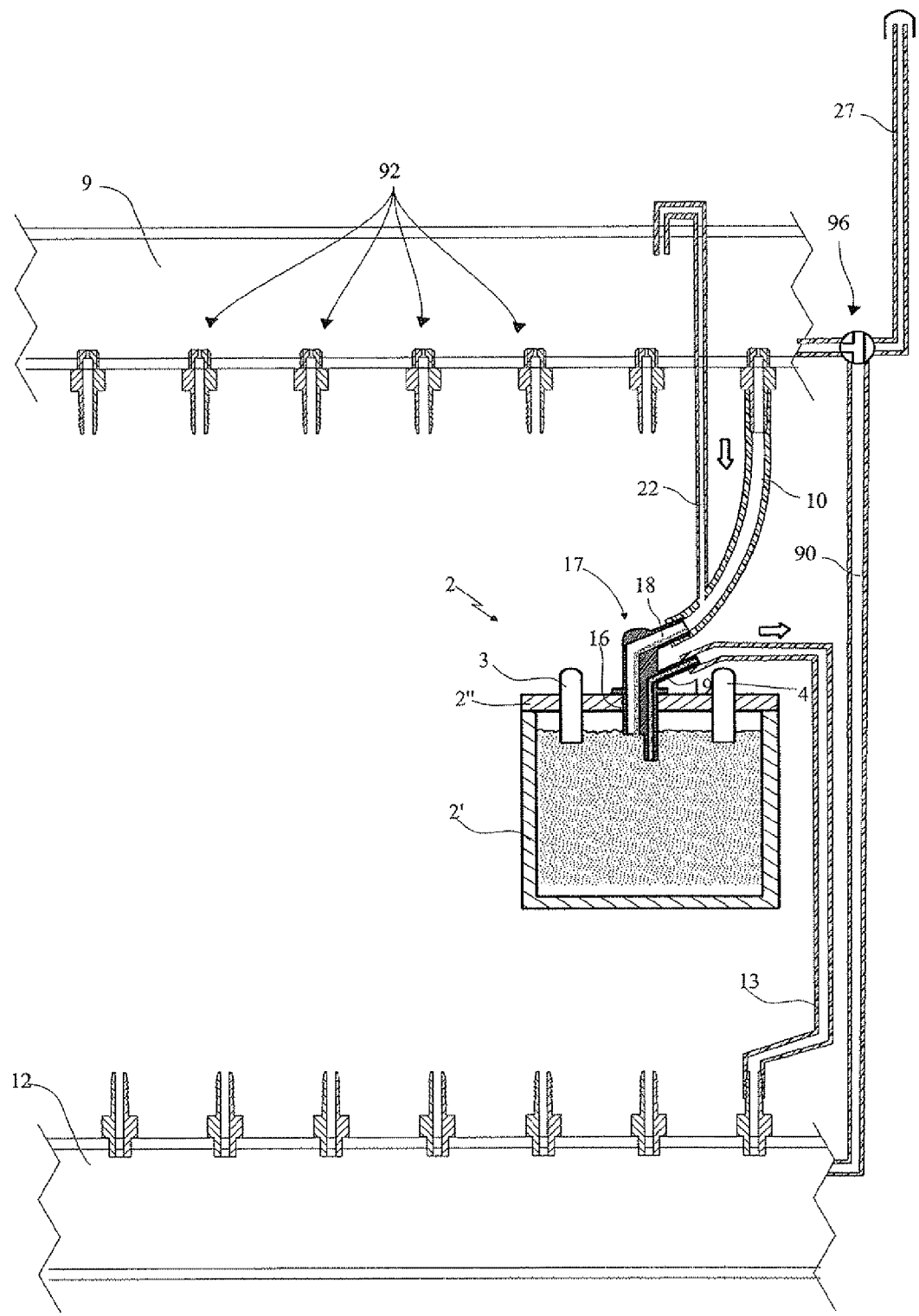
Figure 4:
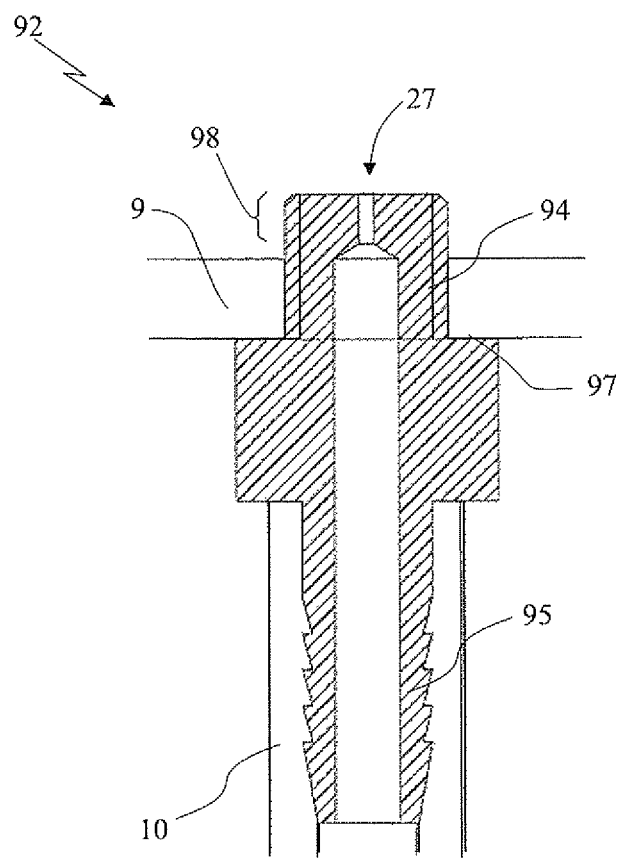
FIG. 4 shows a detail of the plant of FIG. 1 relative to a connector spout mounted on the distribution manifold.

Such third ventilation connector 22 is connected to the metering cap by means of a ventilation duct 20 obtained like the inlet duct 18 and the outlet duct 19 in a single body with the body of the cap 17 inserted in the opening 16 of the cover 2"; or, in accordance with a modified embodiment illustrated in FIG. 3', the third ventilation connector 22 can be obtained by means of a bypass branch from the same inlet duct 10 which in such case will therefore have a branch constituted by the first connector 18 connected to the distribution manifold 9 and a branch constituted by the third connector 22 that releases to the atmosphere or connected to a second manifold that releases to the atmosphere.

The metering cap 17 can therefore be provided with three separate ducts, of which one is inlet 18, one outlet 19 and one ventilation 20 (FIG. 3) or it can be provided with only two ducts of which one is inlet and one outlet 18, 19, a bypass 20 having been provided in the inlet duct 18 adapted to operate as a ventilation duct.

Due to such ventilation duct 20, the entrance of air from the outside environment is facilitated, such air coming to dilute the concentration of the inflammable gases that are formed inside the cell 2.

The ventilation duct 20 achieves an equalization of the pressure inside the cells 2 with the external atmospheric pressure, preventing placing the interior of the cells 2 under low pressure, or preventing the head of the first distribution manifold 9 from creating an overpressure inside the cells 2 which could deform the casing thereof.

Advantageously, the metering cap 17 can also be provided with a seat (not illustrated) for a temperature probe adapted to measure the temperature at the outlet duct 19.

The distribution manifold 9 is provided with a piezometric duct 27 which ensures a constant and controlled head on the inlet ducts 18 of the metering caps 17 in a manner so as to keep under control the flow of the electrolytic solution that feeds cells 2. For such purpose, the valve 24 can be of modulating type in order to precisely control the flow from the delivery tube 8 to the first distribution manifold 9.

The flow that transits in the single elements 2 has a rather low flow rate, so as to allow the charging inside the elements 5 through the occurrence of the correct electrochemical reactions on the plates.

Figure 2:
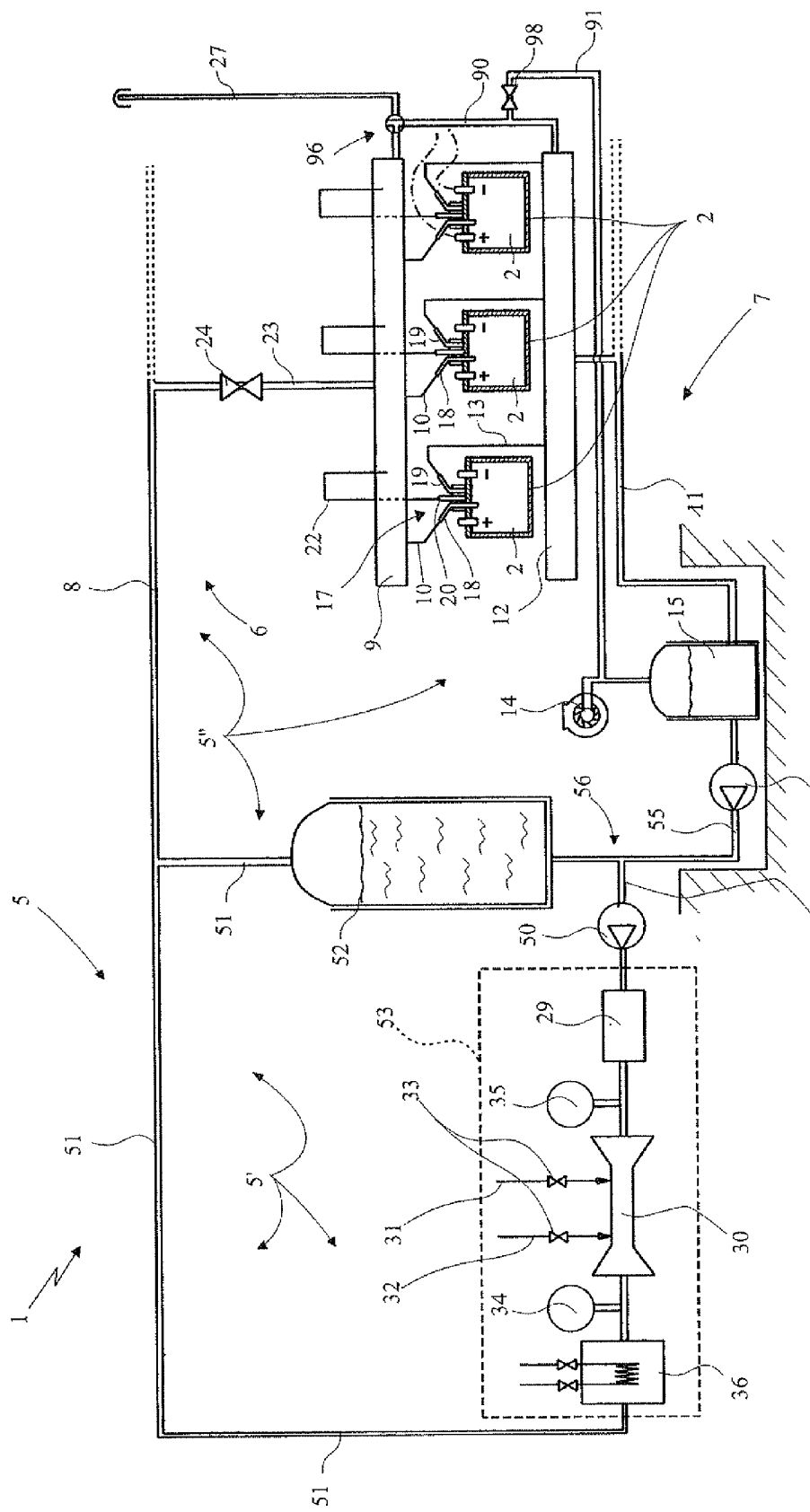
FIG. 2 shows a diagram of a second embodiment of a plant for the electrochemical formation of lead-acid batteries, object of the present invention, with electrolytic solution flow drawn from the cells via dropping by means of gravity.

The extraction of the flow of electrolytic solution by means of the outlet ducts 19 of the metering caps and by means of the relative second connectors 13 can occur, in accordance with the first embodiment of a plant illustrated in FIG. 1, via suction by creating low pressure inside the aforesaid outlet ducts 19, or it can be produced, in accordance with the second embodiment of a plant illustrated in FIG. 2, by the simple thrust produced by the flow of electrolytic solution entering into cell 2 through the inlet ducts 18 of the metering caps 17.

If the extraction occurs via suction, the low pressure is achieved by means of an electric fan 14, which is advantageously connected to the collection tube 11 and is adapted to release the air in the atmosphere after having subjected it to filtering operations. Preferably, the electric fan 14 produces low pressure in the collection manifold 12 of a size susceptible of sucking, through the second connectors 13, the flow of electrolytic solution from the cells 2 of the batteries.

The low pressure via the suction of the solution through the outlet ducts 19 of the caps 17 must be balanced by the arrival of the electrolytic solution flow through the inlet ducts 18, in a manner so as to suck that which arrives, or little more than this, without ever having to suck an excessive quantity of air and consequently have to excessively oversize the electric fan 14.

The suction produced by the electric fan 14, i.e. the low pressure in the collection manifold 12, is therefore substantially calibrated through the outlet ducts 19 for a flow rate slightly greater than the average of the flow of electrolytic solution entering cell 2. In this manner, even when the lower ends of the outlet ducts 19 are situated slightly above the surface of the electrolytic solution, the flow rate of air sucked by the electric fan 14 through the second connector 13 as well as through the collection manifold 12 is reasonably limited by the calibrated section of the same outlet ducts 19.

In this case, in which the extraction of the flow of electrolytic solution occurs via suction, it is not necessary to achieve a seal of the metering cap 17 that is perfectly hermetic, given that the air sucked by possible openings comes to ventilate the ducts of the return means 7.

Otherwise, the extraction of the flow of electrolytic solution from the cells can occur, as said, without low pressure but only following the thrust produced by the flow of electrolytic solution entering into the cell through the inlet ducts 18 of the metering caps 17.

In this case, it is therefore the same flow entering into the cells 2 that thrusts an equal flow exiting towards the return means 7 preferably also comprising in this case a collection tube 11 connected to at least one collection manifold 12.

In the latter case, even if the extraction of the flow of electrolytic solution does not occur via suction in low pressure, the collection tube 11 can still be subjected to a slight low pressure by means of the connection to an electric fan 14 for creating ventilation in the collection tube, aimed to prevent dangerous concentrations of hydrogen.

Advantageously, the collection tube 11 can be intercepted by an intermediate tank 15 adapted to separate the liquid phase from the gaseous phase, and in such case the electric fan 14 can be mounted on top of the tank in order to suck the gaseous phase.

In accordance with both abovementioned embodiments, the electrolytic solution—which, coming from the cells 2, reaches the collection manifold 12 due to the low pressure created by the electric fan 14 or due to the thrust of the entering flow as well as due to gravity—is then sent to the collection tube 11 of the plant which preferably acts as a separator sized to be only partially filled. Possibly, a dedicated separator 15 can also be provided for, in both embodiments, which advantageously can be arranged buried.

The quantity of electrolytic solution which must circulate in the cells 2 of the batteries, or the flow of electrolytic solution, must be generally controlled by a modulating valve (indicated hereinbelow as first valve 24), in order to allow the start of the correct chemical reactions inside the elements 2. The aforesaid quantity of electrolytic solution that traverses the elements is advantageously made to vary in an automatic manner in order to maintain the temperature substantially constant, and typically comprised between 45° and 55° C., so as to prevent dangerous overheating of the raw material deposited on the plates of the elements 2. Further deviations in the first flow of electrolytic solution can also depend on the recovery of water or sulfuric acid in the external circuit.

According to the idea underlying of the present invention, the plant 1 comprises suction means connected to the distribution manifold 9 and actuatable by a logic control unit (not illustrated) to suck, with the first valve 24 in closed position, the electrolytic solution contained in the distribution manifold 9 as well as the lumps present therewith into the inlet ducts 18 of the metering caps 17 and/or into the first connectors 10 for conveying the flow of electrolytic solution from the distribution manifold to the cells 2.

The suction means comprise a suction duct 90 connected on the upper part to the distribution manifold 9 and on the lower part to the return means 7, and a low pressure source in communication with such suction duct 90 for drawing the electrolytic solution from the distribution manifold 9 and conveying it to the return means 7.

Such low pressure source can be obtained:
with the collection manifold 12 which, in accordance with the preferred embodiment of the present invention illustrated in FIG. 1, is arranged in low pressure by the electric fan 14 advantageously already provided for creating a sufficient level of vacuum adapted to suck the flow of electrolytic solution from the outlet ducts 19 and from the second connectors 13,
or with a dedicated electric fan indicated with a dashed line in FIG. 1;
or with a branch duct 91 that, in accordance with the second embodiment of the plant 1 mentioned above and illustrated in FIG. 2, is connected to the suction duct 90 and is in communication with the electric fan 14 advantageously already provided for creating in the collection tube 11, or even only in the intermediate tank 15, low pressure aimed to ventilate, preventing the formation of dangerous concentrations of hydrogen; in this case, the suction duct 90 will preferably suck the flow of electrolytic solution of the inlet duct 18, drawing it from the ventilation duct 20 up to that moment functioning as a piezometric indicator.

Advantageously, the suction duct 90 is intercepted by a second valve 96, in particular of three-way type susceptible of selectively connecting the distribution manifold 9 to the outside environment or to the return means 7.

In the case of a dedicated electric fan 14 or if the electric fan 14 present for ventilating the return means 7 is utilized (example outlined in a dashed line in FIG. 1 and example of FIG. 3), a third valve 98 will be advantageously present for allowing or not allowing the suction of the electrolytic solution from the distribution manifold 9 simultaneously with the closure of its feed i.e. of the first valve 24.

The logic control unit controls by activating the suction means, for example at regular intervals, for clearing the lumps of organic material of the ducts that can be formed in the inlet ducts 18 of the metering caps 17 and/or in the first connectors 10 for conveying the electrolytic solution from the distribution manifold to the cells 2.

In accordance with one possible embodiment, each inlet duct 18 of the metering caps 17 has a calibrated section for metering the flow of electrolytic solution which comes from the first connectors 10 with wider section and feeds the relative cell 2, the aforesaid suction means being susceptible of sucking the lumps that have stopped at such calibrated sections of the inlet ducts 18.

The suction of the electrolytic solution contained in the distribution manifold 9 will also suck the solution present in the first connectors 10 and in the inlet ducts 18 of the metering caps 17, driving the lumps into the distribution manifold 9 as well that, as said, may have stopped at such calibrated sections of the inlet ducts 18. Through the suction duct 90, the electrolytic solution sucked from the distribution manifold 9 as well as from the inlet ducts 18 of the metering caps 17 from the first connectors 10 is sent, bypassing the cells 2, to the return means 7 and in particular to the collection manifold 12. From here, the electrolytic solution continues the circulation in the circuit 5 until it reaches a filtering group 29 where the lumps are intercepted and eliminated from the circuit 5.

Otherwise, in accordance with the preferred embodiment of the plant, object of the present invention, illustrated in FIGS. 3, 3' and 4, a plurality of connector spouts 92 is provided, each of which fixed on the bottom of the distribution manifold 9 and connected to the first connector duct 10.

The aforesaid connector spouts 92 are provided with a calibrated section 93 for metering the flow of electrolytic solution that feeds the cells 2, being smaller than the section of the corresponding first connector 10.

Such calibrated section 93 is thus situated at the distribution manifold 9, such that possible lumps that are formed in the circuit 5 remain blocked in such section at the distribution manifold 9. Consequently, when the suction means are actuated to suck the electrolytic solution present in the distribution manifold 9, the lumps can easily pass into the wider space of the distribution manifold 9 itself and hence be easily conveyed to the return means 7 without traversing the cells 2, before then being captured by the filtering group 29.

Each connector spout 92 is advantageously provided with a threaded portion 94, which is mechanically and sealingly engaged in a corresponding opening obtained on the bottom of the distribution manifold 9 until it reaches in abutment against such bottom with a shoulder 97, and with a tube-carrier portion 95 in which one end of the first connector 10 is coupled.

Preferably, the connector spouts 92 project, with their supply mouth placed inside the distribution manifold 9, above the level of the bottom in order to facilitate the passage of the lumps blocked at the mouth of the inlet ducts 18 in the same distribution manifold 9 during the actuation of the suction means.

Each connector spout 92 is provided with a through hole for the passage of the electrolytic solution, which is longitudinally extended for the entire extension thereof with an initial segment 98 with calibrated section 93 that is extended from the mouth and which can have size preferably comprised between 0.7 and 1.8 mm. Advantageously, the calibrated section can initially have a minimal size, which will then be easily enlarged with a milling drill. For such purpose, i.e. in order to facilitate an easy milling, the initial extension segment 98 of the calibrated section 93 can be contained inside the threaded portion 94.

Since the calibrated section 93 of the spout 92 represents the narrowest point of the circuit 5, possible lumps which have formed or stopped in such calibrated section are then cleared during the actuation of the suction means, or they move without creating obstructions in the cells 2.

The lumps, once cleared from the spout 92, are reintroduced into the return means 7 in order to reach the filtering group 29 where they are intercepted and eliminated from the circuit 5.

In accordance with the plant embodiment illustrated in the enclosed figures, the circuit 5 of the electrolytic solution is preferably composed of a main circuit 5', in which a main flow circulates by means of pump 50, such main flow considerably greater than the flow that comes from the collection tube 11 of the first flows that hit the elements 2; it also consists of a secondary circuit 5", which draws the single flow necessary for the elements 2 from the main circuit 5' with the delivery tube 8, and it then reintroduces the same flow in the same main circuit 5' after having collected it at the outlet of the elements 2, with the collection tube 11.

The main circuit 5' comprises a third tube 51, from which the delivery tube 8 departs, which is intercepted by a storage tank 52 for the electrolytic solution and by means for controlling the temperature and the concentration, indicated overall with the reference number 53.

The flow of electrolytic solution coming from all the elements 2, and which has been collected in the separator tank 15, is then made to flow by means of a second pump 54 and through a fourth tube 55 into the main circuit 5', preferably at a junction point 56 arranged immediately upstream of the first pump 50.

The pump 54 delivers a greater head than that present in the main circuit 5' at the junction point 56, in order to allow the flow of electrolytic solution of the secondary circuit 5" to be introduced into the main circuit 5'.

Such electrolytic solution coming from the elements 2 has a higher temperature than that of the electrolytic solution with which the elements 2 were previously fed through the distribution manifold 9.

The abovementioned control means 53 advantageously comprise a filtering group 29, which filters possible impurities that were collected by the flows of electrolytic solution inside the single elements 2 during the charge step.

Downstream of the filtering group 29, an mixer 30 is provided for continuously adjusting the density of the electrolytic solution. Joining the aforesaid mixer 30 are a water feed line 31 and a sulfuric acid feed line 32, both subjected to respective control means 33. The latter are preferably constituted by modulating valves which allow introducing calibrated flow rates of fluid, proportional to the opening of the valve itself.

Upstream and downstream of the mixer 30, two devices are provided for detecting the electrolyte concentrations in the solution, indicated respectively with 34 and 35.

As a function of the concentration detected thereby, water and/or electrolyte (sulfuric acid) are added by the mixer 30 to the electrolytic solution.

Indeed, since the flow that circulates in the main circuit 5' is constant, by knowing the electrolyte concentration in solution with the detector devices 34 and 35, it is possible by means of the mixer 30 to precisely control the concentration of the solution.

Downstream of the mixer 30, a cooling group 36 is provided for cooling the electrolytic solution.

Also forming the object of the present invention is a process for the electrochemical formation of lead-acid batteries, in particular employing the plant of the above-described type; the same reference numbers are maintained hereinbelow in order to facilitate the description.

Such process comprises the operative steps described hereinbelow.

First of all, an initial step is provided for filling the cells of the batteries with the electrolytic solution. Then, the formation of the batteries is started, initially preferably without circulation of the electrolytic solution, or with the first valve 24 in closed position.

Subsequently, the process for the electrochemical formation of the cells of the lead-acid batteries provides for, in accordance with programmable charge cycles well known to the man skilled in the art, increasing the current in order to accelerate the formation.

Correspondingly, for example upon reaching pre-established temperatures or times, there is at least one step for circulating the electrolytic solution, in which a flow thereof traverses the cells 2 and flows into the external circuit 5; the flow being cooled, it thus maintains the temperature in the cells 2 themselves controlled within values such to prevent damage thereto.

During such circulation step, the first valve 24 is in open position for feeding the distribution manifold 9 with the electrolytic solution.

In accordance with the idea underlying the present invention, at least one cleaning step is provided in which the feeding of the distribution manifold 9 with the electrolytic solution is interrupted by means of closure of the first valve 24, and in which the distribution manifold 9 is connected to suction means adapted to extract the electrolytic solution contained in the distribution manifold 9 as well as possible lumps present therewith into the inlet ducts 18 and/or into the first connectors 10 for conveying the flow of electrolytic solution from the distribution manifold to the cells 2.

More in detail, the aforesaid cleaning step also provides for the closure of the first valve 24 in order to block the feeding to the distribution manifold 9, and it can also provide for the opening of at least one second valve 96 placed to intercept a suction duct 90 connected to the return means 7 placed under low pressure by an electric fan 14. In particular, in accordance with the plant embodiments illustrated in the enclosed figures, the suction duct 90 can be connected through the second valve 96 to the return tube 11 or to the collection manifold 12 of the return means 7.

Preferably, the aforesaid cleaning step is obtained at pre-established time intervals (e.g. on the order of 10 minutes), by interrupting the step for circulating the electrolytic solution.

The finding thus conceived therefore attains the pre-established objects.

The invention claimed is:

1. Improved plant for the electrochemical formation of lead-acid batteries, of the type where each is provided with a rigid container (2'), closed on the upper part by a cover (2"), and containing at least one cell (2), said plant (1) comprising:
   at least one external circuit (5) in which an electrolytic solution flows, such circuit provided with supply means (6) for conveying, in the cells (2) of said batteries, a flow of electrolytic solution at a controlled pressure, and return means (7) for extracting said flow of electrolytic solution from said cells (2); said supply means (6) comprising at least one distribution manifold (9) and at least one first valve (24) arranged upstream of said distribution manifold (9);
   a plurality of metering caps (17) removably and sealingly mounted on the covers (2") of said batteries at the same number of cells (2), each metering cap (17) being provided with:
      at least one inlet duct (18) connected with a first connector (10) to said distribution manifold (9) for feeding a corresponding said cell (2) with said flow of electrolytic solution;
      at least one outlet duct (19) connected with a second connector (13) to said return means (7) for extracting said flow of electrolytic solution from said cell (2);
   wherein said improved plant comprises suction means connected to said distribution manifold (9) and configured for sucking, with said first valve (24) closed, the electrolytic solution contained in at least said distribution manifold (9) as well as lumps present in the inlet ducts (18) and/or in the first connectors (10);
   wherein said suction means comprise a suction duct (90) connected to said distribution manifold (9) and to said return means (7) bypassing said cells (2), and a low pressure source in communication with said suction duct (90) and configured for drawing the electrolytic solution from said distribution manifold (9) and conveying the electrolytic solution to said return means (7) through said suction duct (90).

2. Improved plant for the electrochemical formation of lead-acid batteries according to claim 1, wherein each metering cap (17) is connected to the outside environment by means of a third connector (22).

3. Improved plant for the electrochemical formation of lead-acid batteries according to claim 1, which comprises a plurality of connector spouts (92), each fixed to said distribution manifold (9), connected to said first connector duct (10) and provided with a calibrated section for metering the flow of electrolytic solution that feeds the cell (2), being smaller than the section of the corresponding first connector (10); said suction means being susceptible of sucking lumps present in said connector spouts (92).

4. Improved plant for the electrochemical formation of lead-acid batteries according to claim 3, wherein said connector spouts (92) project with their supply mouth into said distribution manifold (9).

5. Improved plant for the electrochemical formation of lead-acid batteries according to claim 1, wherein said suction duct (90) is connected to said distribution manifold (9) and in communication with an electric fan.

6. Improved plant for the electrochemical formation of lead-acid batteries according to claim 5, wherein said suction duct is connected to a return tube of said return means (7) or to a collection manifold of said return means (7), placed under low pressure by said electric fan (14).

7. Improved plant for the electrochemical formation of lead-acid batteries according to claim 5, wherein said suction duct (90) is intercepted by a second valve (96) susceptible of selectively connecting said distribution manifold (9) to the outside environment or to said return means (7).

8. Improved plant for the electrochemical formation of lead-acid batteries according to claim 2, wherein said third connector (22) is connected to the metering cap (17) by means of a ventilation duct (20) integral with the metering cap or by means of a bypass branch from said inlet duct (18).

9. Improved plant for the electrochemical formation of lead-acid batteries according to claim 1, wherein each inlet duct (18) of said metering caps (17) has a calibrated section for metering the flow of electrolytic solution that feeds the cell (2), being smaller than the section of the corresponding first connector (10) to which said inlet duct (18) is connected; said suction means being susceptible of sucking lumps present in the inlet ducts of said metering caps (17).

10. Improved plant for the electrochemical formation of lead-acid batteries according to claim 7, wherein said second valve (96) is of three-way type.

* * * * *